(12) United States Patent
Paris et al.

(10) Patent No.: US 7,118,728 B2
(45) Date of Patent: Oct. 10, 2006

(54) METHOD AND APPARATUS FOR MAKING FERRITE MATERIAL PRODUCTS AND PRODUCTS PRODUCED THEREBY

(75) Inventors: Henry G. Paris, Chattanooga, TN (US); Danny R. Smith, Chattanooga, TN (US)

(73) Assignee: Steward Advanced Materials, Inc., Chattanooga, TN (US)

( * ) Notice: Subject to any disclaimer, the term of this patent is extended or adjusted under 35 U.S.C. 154(b) by 517 days.

(21) Appl. No.: 10/430,948

(22) Filed: May 7, 2003

(65) Prior Publication Data

US 2003/0209820 A1 Nov. 13, 2003

Related U.S. Application Data

(60) Provisional application No. 60/378,745, filed on May 8, 2002.

(51) Int. Cl.
C01G 1/00 (2006.01)
C01G 49/00 (2006.01)
H05H 1/00 (2006.01)

(52) U.S. Cl. ................ 423/632; 423/594.1; 423/594.3; 423/599; 423/594.14; 423/594.16; 423/DIG. 10; 204/280; 204/292; 204/164; 336/177; 336/233; 430/106.1; 430/108.1

(58) Field of Classification Search ................ 423/632, 423/594.1, 594.3, 599, 594.14, 594.16, DIG. 10; 204/280, 292, 164; 336/177, 233; 502/9, 502/439; 430/106.1, 108.1
See application file for complete search history.

(56) References Cited

U.S. PATENT DOCUMENTS

| | | | |
|---|---|---|---|
| 1,946,964 A * | 2/1934 | Cobb | 252/62.6 |
| 4,071,588 A | 1/1978 | Fey et al. | 264/15 |
| 4,162,283 A | 7/1979 | Borer et al. | 264/15 |
| 4,345,015 A | 8/1982 | Hendriksma et al. | 430/137 |
| 4,766,284 A | 8/1988 | Cavanagh | 219/121 |
| 4,816,292 A | 3/1989 | Machida | 427/38 |
| H639 H | 6/1989 | Stern et al. | 264/80 |
| 4,954,235 A | 9/1990 | Takeshima et al. | 204/273 |
| 5,302,306 A * | 4/1994 | Nagata et al. | 252/62.62 |
| 5,419,994 A | 5/1995 | Hongo et al. | 430/106.6 |
| 5,422,216 A | 6/1995 | Smith et al. | 430/108 |
| 5,444,259 A | 8/1995 | Ohmi | 250/452 |
| 5,620,643 A | 4/1997 | Maiden et al. | 264/117 |
| 5,907,077 A * | 5/1999 | Harashima | 423/240 R |
| 5,976,488 A | 11/1999 | Workman et al. | 423/593 |
| 6,033,594 A * | 3/2000 | Enokido et al. | 252/62.62 |
| 6,162,334 A | 12/2000 | Ray et al. | 204/290 |
| 6,332,969 B1 | 12/2001 | Ray et al. | 205/362 |
| 6,372,119 B1 | 4/2002 | Ray et al. | 205/387 |

OTHER PUBLICATIONS

Patent Abstracts of Japan; "Plasma Treated Magnetic Powder", Publication No. 57176703 published Oct. 30, 1982; Inventor: Ido Tadashi.

D. Jiles: "Introduction to Magnetism and Magnetic Materials", 1991, Chapman & Hall. London, publication No. XP-002250637: p. 288, paragraph 2.

\* cited by examiner

*Primary Examiner*—Timothy Vanoy
(74) *Attorney, Agent, or Firm*—Allen, Dyer, Doppelt, Milbrath & Gilchrist, P.A.

(57) ABSTRACT

A method for making ferrite powder may include providing ferrite feed materials in a form of particles having different sizes and irregular shapes, and exposing the ferrite feed materials to a plasma to provide a more spherical shape to irregularly shaped particles to thereby make the ferrite powder. An apparatus for making ferrite powder may include a feeder for ferrite feed materials and a plasma generator for exposing the ferrite feed materials to a plasma.

43 Claims, 5 Drawing Sheets

METHOD AND APPARATUS FOR MAKING FERRITE MATERIAL PRODUCTS AND PRODUCTS PRODUCED THEREBY

RELATED APPLICATIONS

This application claims the benefit of U.S. Provisional Patent Application Serial No. 60/378,745 filed on May 8, 2002, the entire disclosure of which is incorporated herein by reference.

FIELD OF THE INVENTION

The present invention relates to the field of ferrite products and, more specifically, to the field of production of ferrite products.

BACKGROUND OF THE INVENTION

Mixtures of iron oxide, oxides of transition metals, other metals, and semi-metals are basic components in the manufacture of many products that are used for electromagnetic interference (EMI) suppression filters, inductors, and reprographic system components, among others. Ferrite materials, commonly called spinel, may be produced by forming small particles of chemical oxides. Other crystal structures, such as garnet, and hexagonal ferrite, may be also be produced. Such spinel ferrites may be based on an iron oxide denoted by the formula, $MeFe_2O_4$, and may contain as the Me element, for example, some combination of substituted transition metals such as manganese (Mn), nickel (Ni), cobalt (Co), vanadium (V), as well as other oxides of metals such as magnesium (Mg), copper (Cu), aluminum (Al), and zinc (Zn).

These ferrites may also contain semi-metals such as silicon (Si), and other additives such as titanium (Ti), tantalum (Ta), niobium (Nb), vanadium (V), and even alkaline earth metals such as calcium (Ca). In some cases, alkali metals may reside in the ferrite or in other phases.

Although referred to as spinel, garnet and hexagonal ferrite, these materials may be complex multiphase materials containing phases such as FeO and glass formers that are used to control bulk electrical resistivity, eddy currents, frequency response of material impedance, magnetic hysteretic characteristics, total magnetic moment, and sintering characteristics.

The production of ferrites may be controlled intentionally to produce spinels of oxides of iron and other elements, which may occur in more than one valence state having controlled ferrimagnetic properties. In many applications a particular surface morphology and a specific size of powder may be required to achieve desired product properties.

To obtain these desired product properties in a final product shape, a ferrite, or precursor mixture, must first be produced. This may be accomplished by methods well known to persons experienced in the technology and may include processes such as chemical precipitation, the use of naturally occurring oxide ores, or conversion of aqueous solution of metal salts such as chlorides, and even melting the starting ingredients.

The overall elemental composition of the incipient ferrite spinel may be created by mixing exact proportions of metal oxides, or chemical precursors. The overall elemental composition may require grinding elemental oxides in a proper proportion into an intimate mixture of small particle size, and adjusting the composition of the final mixture, which may then be spray dried.

Such mixtures may be subjected to intermediate thermal treatments in rotary or fixed kilns to partially react them, or to produce particle sizes useful for subsequent mechanical processing. After thermal-mechanical processing, the materials may be ground again into small particle size, and the composition may be adjusted to meet a target terminal composition. The materials may thereafter be spray dried in an aqueous process to create an aggregate that may be mixed and blended, pressed into a shape, and sintered.

For some applications, such as reprographic use, the powder may be used in the spray dried and sintered form. In other applications, the powder may be used with, or without, spray drying when it is intended as an additive to a mixture of an inorganic or organic binder.

A process for producing a pre-reacted oxide powder is disclosed in U.S. Pat. No. 5,976,488 to Workman et al., the entire disclosure of which is incorporated herein by reference. While this process produces pre-reacted powder, its particular phase mixture is not typically suitable for direct use in ferrite products without further processing and thermal treatments. Moreover, the atmospheric conditions used to produce such powders may not be effectively controlled to achieve a desired oxidation state and phase composition of all the iron and other elements.

The process described in the Workman et al. patent produces particle morphology that is somewhat useful for carrier bead, but the ratio of ferri-magnetic spinel to non-ferrimagnetic oxides of iron and other elements leads to a magnetic moment that may be too low for use. Further, the ratio may also lead to a volume electrical resistivity that is not suitable. Accordingly, this product must be further processed to produce a useful carrier bead.

Additionally, the process described in the Workman et al. patent may produce detrimental particle shapes, such as broken particles with sharp edges and elongate particles. It may be difficult and costly to remove these irregular particles by traditional separation methods since they exist in a range of sizes. Further, a significant percentage of useful spherical powder may be lost when conventional separation methods are used. A negative economic impact is observed due to a small percentage of total powder that is usable.

SUMMARY OF THE INVENTION

It is therefore an object of the present invention to provide a method and apparatus for efficiently producing ferrite materials.

This and other objects, features, and advantages of the present invention are provided by a method for making ferrite powder by exposing ferrite materials to a plasma. More specifically, the method may comprise providing ferrite feed materials in a form of particles having different sizes and irregular shapes, and exposing the ferrite feed materials to the plasma to provide a more spherical shape to irregularly shaped particles to thereby make the ferrite powder. Exposing the ferrite materials to plasma advantageously enhances the economical efficiency of production of ferrite particles, and advantageously increases a yield of ferrite powder production.

The method may further comprise controlling the step of providing the ferrite feed material or exposing the ferrite feed material to make the ferrite powder to have at least one of a predetermined phase ratio, surface morphology, density, magnetic moment, and volume electrical resistivity. Controlling may comprise controlling at least one of a feed rate, an exposure time, and a temperature of the ferrite feed materials during the exposing.

Controlling may also comprise controlling a composition of the ferrite feed materials, and controllably supplying at least one additional material to the ferrite feed materials during exposure to the plasma. The additional element may be oxygen, hydrogen an inert gas, copper, or silver, for example. The additional material may also be calcined ferrite feed materials. Controllably supplying the additional materials may also include coating the ferrite feed materials with an inorganic salt, such as a silicate, alumina, or an organo-metallic compound, for example.

The ferrite feed materials may comprise nickel ferrite particles, manganese ferrite particles, magnesium ferrite particles, zinc ferrite particles, metal oxides, or any combination of the above-mentioned materials or other ferrites, for example. The metal oxides may be produced by heating waste material in a reactor while supplying oxygen thereto. The metal oxides may be provided by spray drying, for example. The method may further comprise sorting the ferrite powder to have particle sizes within a predetermined range.

Another aspect of the invention is directed to an apparatus for making ferrite powder. The apparatus may comprise a feeder for ferrite feed materials, and a plasma generator for exposing the ferrite feed materials to a plasma.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
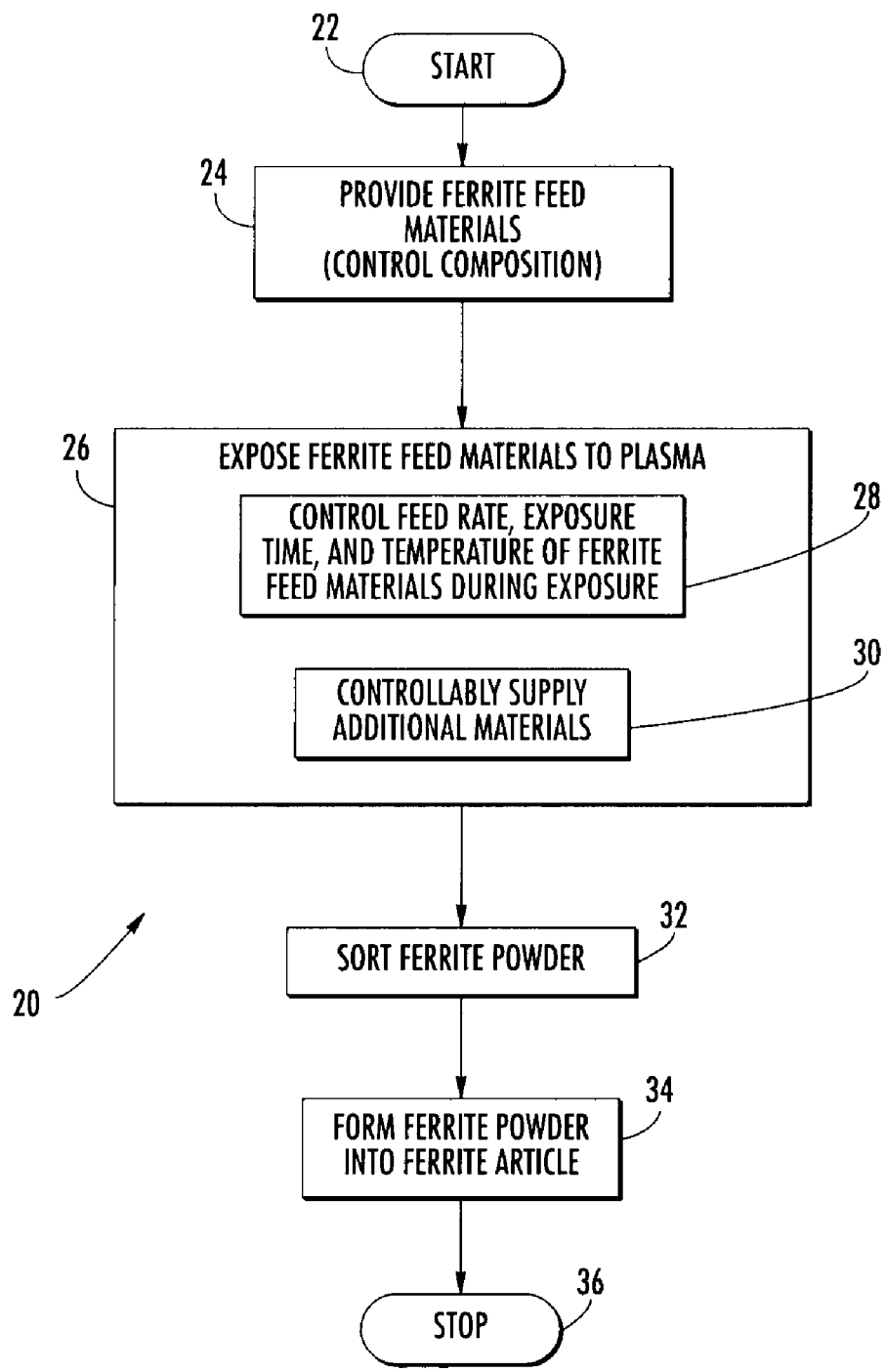
FIG. 1 is a flow chart illustrating a method for making ferrite powder according to the present invention.

Referring initially to the flow chart 20 of FIG. 1, a method for making ferrite powder is now described. From the start (Block 22) ferrite feed materials are provided at Block 24. The composition of the ferrite feed material may be controlled when the ferrite feed material is provided at Block 24.

The ferrite feed materials are in the form of particles having different sizes and irregular shapes. The ferrite feed materials may, for example, comprise nickel ferrite particles or zinc ferrite particles. The ferrite feed materials may also comprise manganese ferrite particles or magnesium ferrite particles so that the ferrite feed materials are advantageously environmentally friendly. Those skilled in the art will appreciate that the ferrite feed materials may comprise any combination of manganese ferrite particles and magnesium ferrite particles. Those skilled in the art will also appreciate that the ferrite feed materials may, of course, comprise any other ferrite particles.

At Block 26, the ferrite feed materials are exposed to plasma. The plasma exposure may, for example, be in the form of plasma spray to pass the ferrite feed material through a high-energy source of course, the ferrite feed material may also be exposed to plasma via a number of other sources, as understood by those skilled in the art. Exposure of the ferrite feed materials to the plasma advantageously provides a more spherical shape to irregularly shaped particles to thereby make the ferrite powder. More specifically, the irregularly shaped particles are melted into more spherically shaped particles. Making the particles more spherically shaped advantageously enhances the efficiency and economics of ferrite particle production. Further, exposure of the ferrite feed materials to the plasma advantageously enhances surface characteristics of the ferrite powder. The ferrite powder may be made to have a predetermined phase ratio, surface morphology, density, magnetic moment, and/or volume electrical resistivity, for example.

A number of different variables of the ferrite powder production may be controlled during the exposure of the ferrite to the plasma. For example, the feed rate of the ferrite feed material may be controlled, the exposure time of the ferrite feed material to plasma may be controlled, and the temperature of the ferrite feed material during exposure to the plasma may be controlled at Block 28. Further, a rate of heat transfer from the plasma may be controlled to thereby control the temperature of the ferrite feed material. A volume of plasma gas, as well as the type of plasma gas, used during plasma exposure may also be controlled. For example, the flow rate of the carrier gas may be regulated. The amperage and voltage used to create the plasma may also be controlled, as understood by those skilled in the art.

Additional materials may be controllably supplied to the ferrite feed materials during exposure to the plasma at Block 30. The additional materials may, for example, include oxygen, hydrogen, inert gas, copper, silver, or any other suitable material, as understood by those skilled in the art.

The ferrite powder generally comprises different sizes. Accordingly, at Block 32, the ferrite powder is sorted to have particles sized within a predetermined range. At Block 34, the ferrite powder is formed into a ferrite article, before stopping at Block 36. More specifically, the ferrite powder may be formed into carrier beads, an inert anode, or a body of an inductor, for example. Those having skill in the art will recognize that the ferrite powder may also be formed into any number of other articles.

Figure 2:
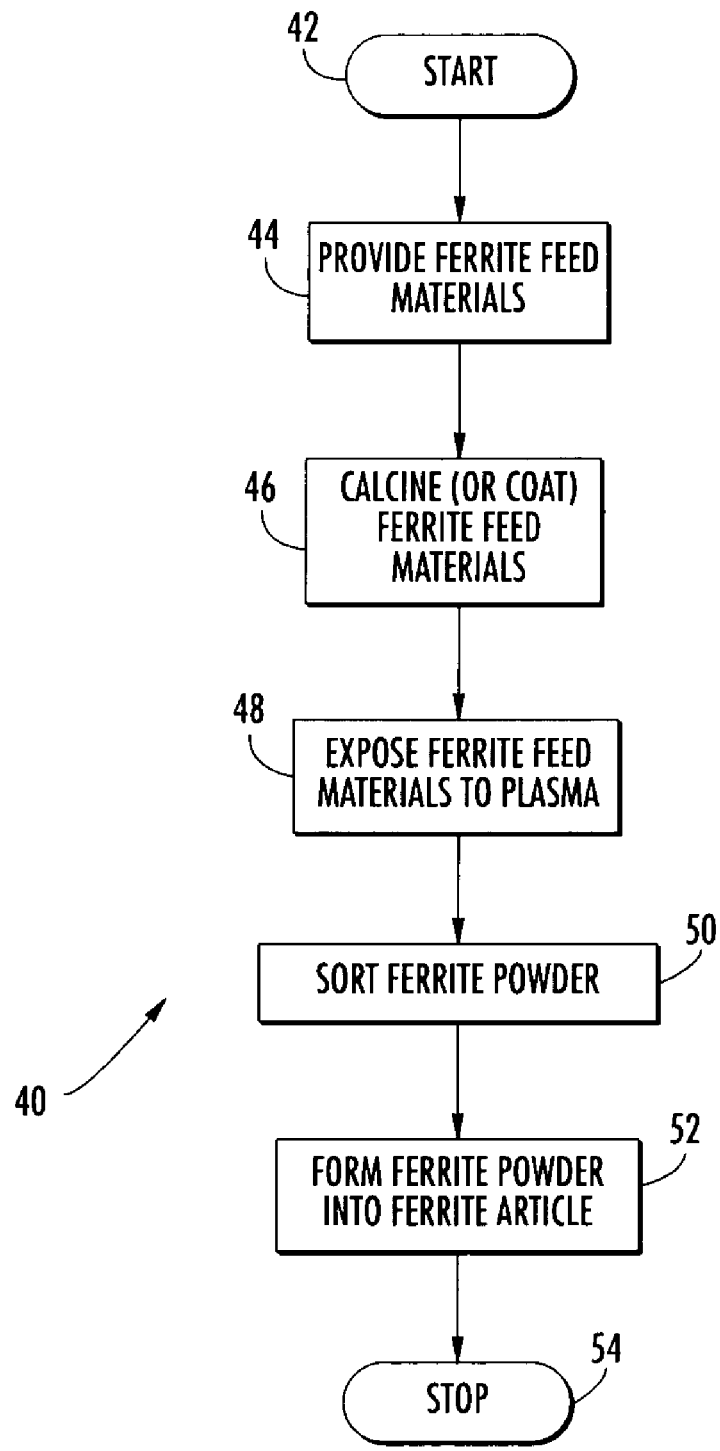
FIG. 2 is a flow chart illustrating a method for making ferrite powder according to the present invention.

Referring now additionally to the flow chart 40 of FIG. 2, another method for making ferrite powder is now described. From the start (Block 42), the ferrite feed materials are provided at Block 44. At Block 46 the ferrite feed materials are calcined. The ferrite feed materials are preferably provided by spray dried powder that has been calcined. This advantageously enhances densification of the ferrite feed material and further enhances the economic efficiency of production of the ferrite powder.

The ferrite feed materials may also be coated. The ferrite feed materials are preferably coated with a non-ferrite ceramic precursor, such as an inorganic salt, e.g. silicate, alumina, organometallic, or calcium. Those skilled in the art will appreciate that the ferrite materials may also be coated with other materials that decompose during the plasma exposure process to native oxides in fairly thin layers.

Coating the ferrite feed materials may be particularly advantageous when using the ferrite powder to form carrier beads. More specifically, coating the ferrite feed materials advantageously enhances resistivity for carrier beads. Coating the ferrite feed materials may also advantageously enhance other surface properties in applications where special surfaces may be required, such as sensors and catalysts, for example.

Coating may be a pretreatment of "virgin" ferrite feed materials, i.e., ferrite feed materials that have not yet been exposed to plasma. Coating may also be a post treatment of ferrite feed materials that have been exposed to plasma to thereby create new ferrite feed material of coated ferrite particles. Coating the ferrite feed materials may advantageously enhance resistivity, dielectric breakdown voltage, increase carrier life, or create novel catalysts.

At Block 48, the ferrite feed materials are exposed to plasma, as described above. The ferrite powder sorted at Block 50, and formed into a ferrite article at Block 52 before stopping at Block 54.

Figure 3:
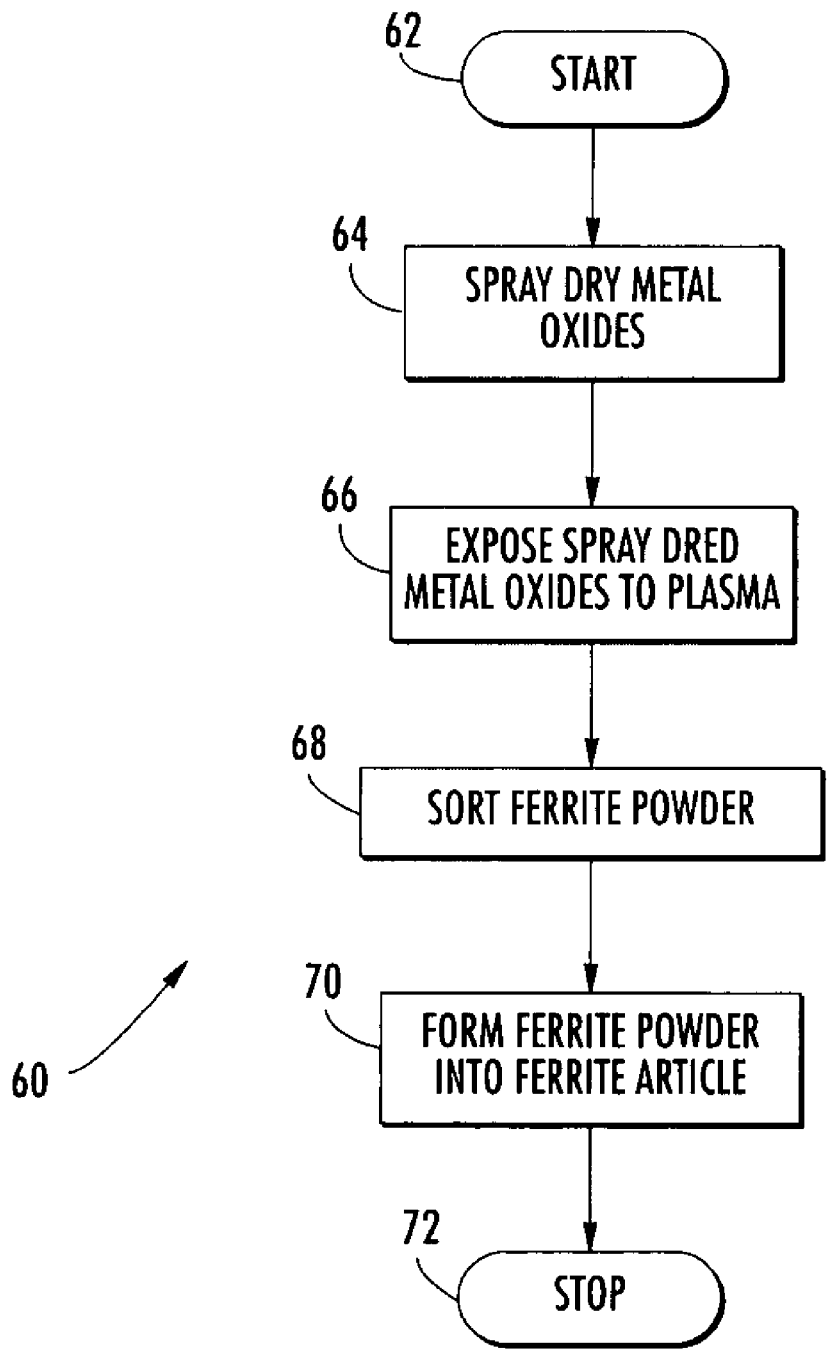
FIG. 3 is a flow chart illustrating a method for making ferrite powder according to the present invention.

Turning now additionally to the flow chart 60 of FIG. 3, another method for making ferrite powder is now described. Metal oxides are spray dried at Block 64, and exposed to plasma at Block 66. The ferrite powder is sorted at Block 68, and formed into a ferrite article at Block 70 before stopping at Block 72.

Figure 4:
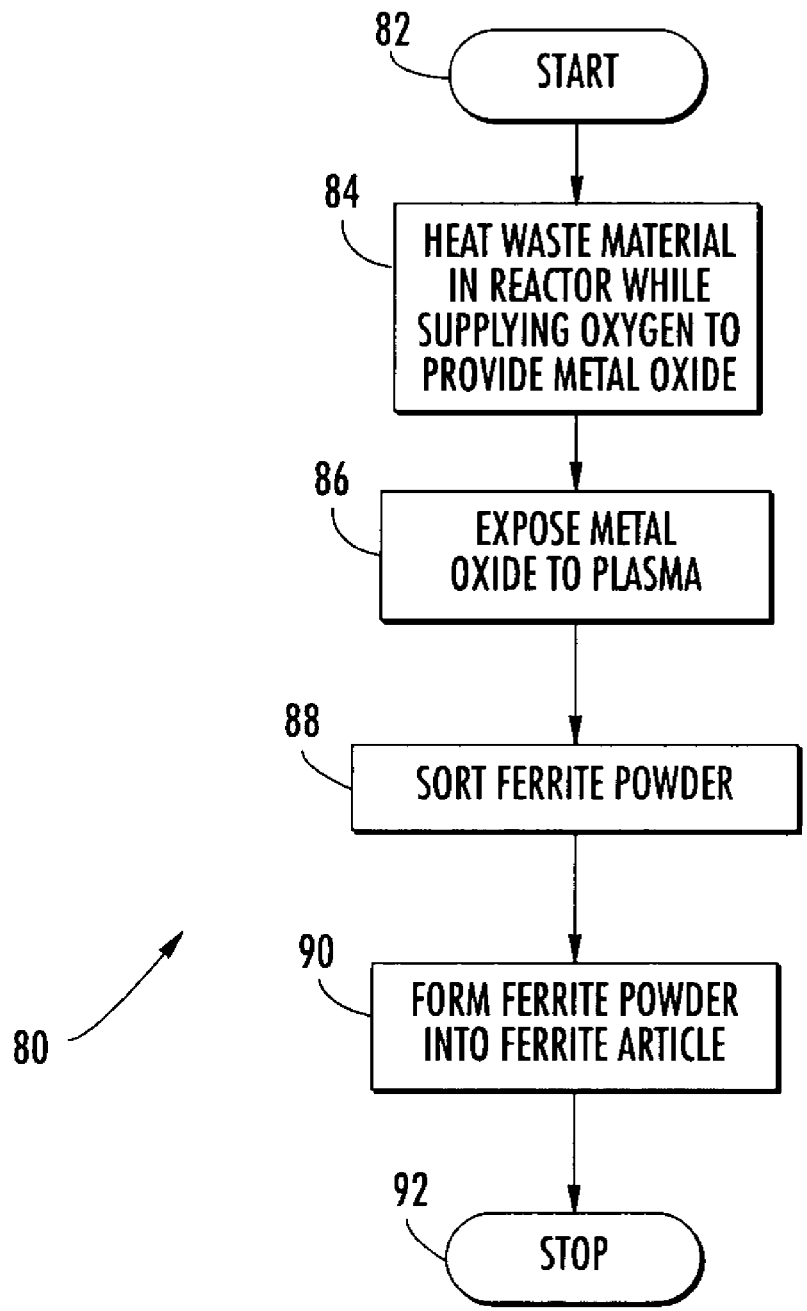
FIG. 4 is a flow chart illustrating a method for making ferrite powder according to the present invention.

Referring now additionally to the flow chart 80 of FIG. 4, yet another method for making ferrite powder is described. From the start (Block 82) waste material is heated in a reactor while supplying oxygen at Block 84 to provide metal oxide. The metal oxide is exposed to plasma at Block 86. The ferrite powder is sorted at Block 88, and formed into a ferrite article at Block 90 before stopping at Block 92.

Figure 5:
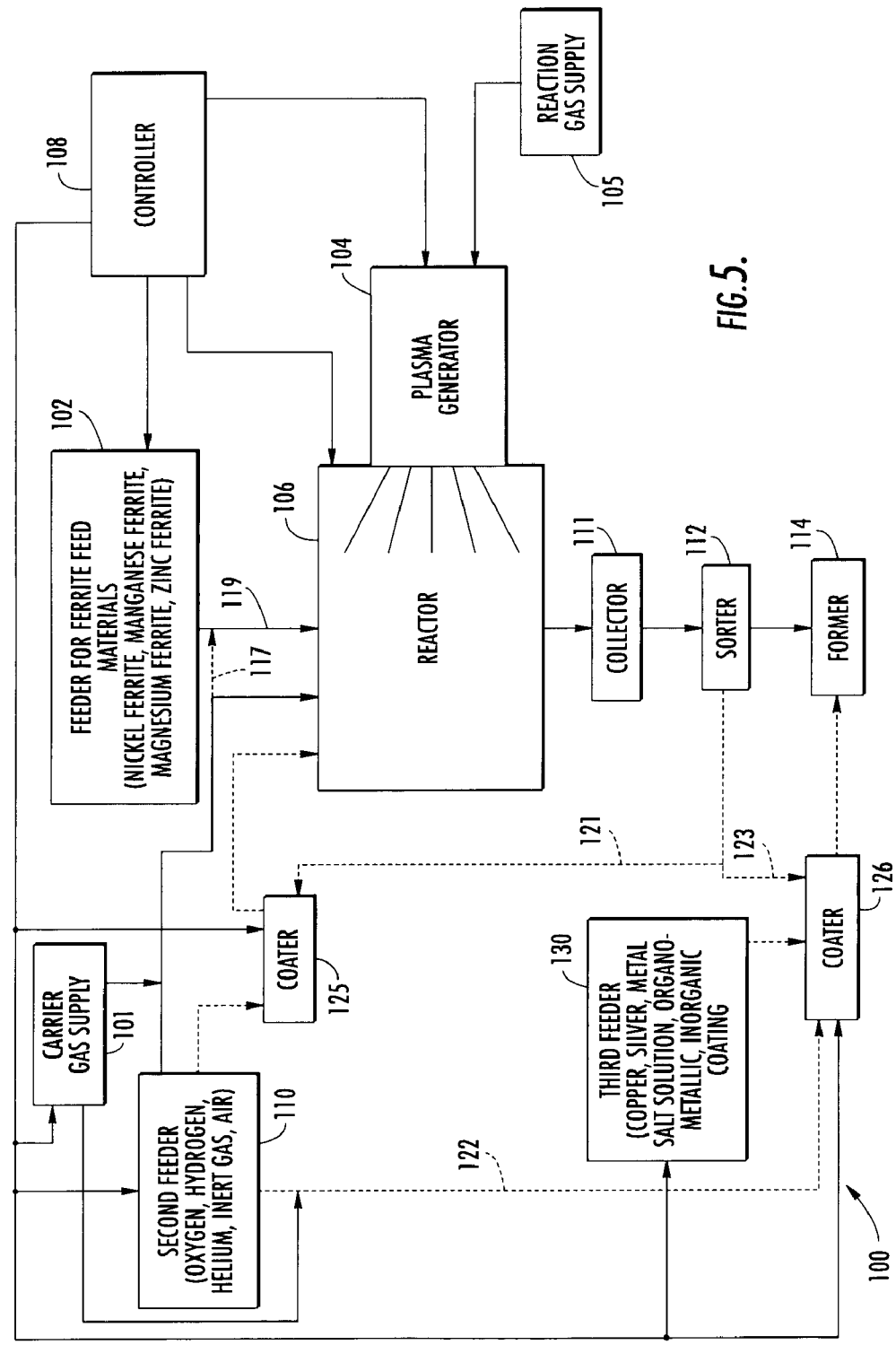
FIG. 5 is a schematic block diagram of an apparatus for making ferrite powder according to the present invention.

Referring additionally to FIG. 5, another aspect of the present invention is directed to an apparatus 100 for making ferrite powder, and is now described. The apparatus 100 illustratively comprises a feeder 102 for ferrite feed materials in a form of particles having different sizes and irregular shapes. As described above, the ferrite feed materials may, for example, comprise nickel ferrite, manganese ferrite, magnesium ferrite, zinc ferrite, other ferrites, or any combination thereof, as understood by those skilled in the art.

The apparatus 100 also illustratively comprises a plasma generator 104 for exposing the ferrite feed materials to plasma to provide a more spherical shape to irregularly shaped particles to thereby make the ferrite powder. Reaction gas is illustratively supplied to the plasma generator 104 from a reaction gas supply 105. A valve (not shown) may be positioned between the reaction gas supply 105 and the plasma reactor 104 to regulate the flow of reaction gas.

The feeder 102 illustratively feeds the ferrite feed material into a reactor 106. The ferrite feed material is exposed to the plasma from the plasma generator 104 in the reactor 106.

The apparatus 100 further illustratively comprises a controller 108 for controlling the feeder 102, the plasma generator 104, and the reactor 106 to make the ferrite powder to have a predetermined phase ratio, surface morphology, density, magnetic moment, and/or volume electrical resistivity. The controller 108 may control the feed rate of the ferrite feed material from the feeder 102, the exposure time of the ferrite feed material to the plasma from the plasma generator 104, or the temperature of the ferrite feed materials when being exposed to the plasma in the reactor 106. As indicated above, the rate of heat transfer from the plasma may be controlled to thereby control the temperature of the ferrite feed material. As also indicated above, the volume of plasma gas, as well as the type of plasma gas, used during plasma exposure may also be controlled.

The apparatus 100 also illustratively comprises a second feeder 110 to supply at least one additional material to the ferrite feed material. As noted above, the at least one additional material may, for example, comprise oxygen, hydrogen, helium, inert gas, air, or any other material as understood by those skilled in the art. The controller 108 is illustratively connected to the second feeder 110 to thereby control variables, such as feed rate, for example, of the additional material. The apparatus 100 also illustratively includes a carrier gas supply 101 for supplying carrier gas into the stream carrying the additional material from the second feeder 110. The carrier gas supply 101 is illustratively connected to the controller 108.

The apparatus 100 further illustratively comprises a collector 111 downstream from the reactor 106 for collecting ferrite powder, and a sorter 112 downstream from the collector for sorting the ferrite powder to have particle sizes within a predetermined range. Those skilled in the art will understand that the predetermined range is dependent upon the article that is formed using the ferrite powder. The apparatus 100 also illustratively comprises a former 114 for forming the ferrite powder into a ferrite article, such as carrier beads, an inert anode, or a body of an inductor, for example.

The additional material may also illustratively be supplied from the second feeder 110 to a feed stream 119 from the feeder 102 to the reactor 106 (indicated by dashed arrow 117). The carrier gas supply 101 illustratively supplies carrier gas to the stream 117 carrying the additional material to the feed stream 119.

The ferrite powder may be recycled into the reactor 106, as indicated by the stream of dashed arrow 121. In such a case, the ferrite powder material is taken from the sorter 112 and sent to a coater 125. The coater 125 is illustratively connected to the controller 108. The additional material from the second feeder 110 is also added to the coater 125. Accordingly, the recycled ferrite powder and additional material from the second feeder 110 is supplied to the reactor 106.

The additional material may also be added from the second feeder 110 to the ferrite powder after it has been passed through the sorter 112. The additional material is preferably provided to another coater 126 (indicated by the dashed arrow 122). The ferrite powder is also illustratively supplied to the coater 126 from the sorter 112 (as indicated by the dashed arrow 123). Other additional material may also be added to the coater 126 from a third feeder 130, and may include copper, silver, metal salt solution, organometallic, inorganic coating, or any other material as understood by those skilled in the art. The third feeder 130 and the coater 126 are illustratively connected to the controller 108, and carrier gas from the carrier gas supply 101 is illustratively supplied to the feed stream 122 from the second feeder 110.

The method and apparatus 100 described above may be used to produce smooth, spherical ferrite powder from previously sintered feedstock. More specifically, the previously sintered feedstock may have a larger than desirable average particle diameter. The particles may be produced by first grinding the feed to a desired average diameter, classifying the feed to remove unwanted particles, then passing the feed through the plasma. Classifying the feed to remove unwanted particles is preferable, as exposure to the plasma may not alter particle diameter.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A method for making ferrite powder comprising:
   providing ferrite feed materials including at least one of nickel ferrite particles, manganese ferrite particles, magnesium ferrite particles, and zinc ferrite particles having different sizes and irregular shapes; and
   exposing the ferrite feed materials to a plasma to provide a more spherical shape to irregularly shaped particles to thereby make the ferrite powder.

2. A method according to claim 1 further comprising controlling at least one of providing and exposing to make the ferrite powder to have at least one of a predetermined phase ratio, surface morphology, density, magnetic moment, and volume electrical resistivity.

3. A method according to claim 2 wherein controlling comprises controlling at least one of a feed rate, an exposure time, and a temperature of the ferrite feed materials during the exposing.

4. A method according to claim 2 wherein controlling comprises controlling a composition of the ferrite feed materials.

5. A method according to claim 4 wherein controlling comprises controllably supplying at least one additional material to the ferrite feed materials during the exposing.

6. A method according to claim 5 wherein the at least one additional material comprises oxygen.

7. A method according to claim 5 wherein the at least one additional material comprises hydrogen.

8. A method according to claim 5 wherein the at least one additional material comprises an inert gas.

9. A method according to claim 5 wherein the at least one additional material comprises at least one of copper and silver.

10. A method according to claim 5 wherein the at least one additional material comprises calcined ferrite feed materials.

11. A method according to claim 5 wherein controllably supplying comprises coating the ferrite feed materials with at least one of a silicate, alumina, and an organo-metallic.

12. A method according to claim 1 wherein providing the ferrite feed materials comprises providing metal oxides.

13. A method according to claim 12 wherein the metal oxides are produced by heating waste material in a reactor while supplying oxygen thereto.

14. A method according to claim 12 wherein providing the metal oxides comprises spray drying the metal oxides.

15. A method according to claim 1 further comprising sorting the ferrite powder to have particle sizes within a predetermined range.

16. A method for making a ferrite article comprising:
    providing ferrite feed materials in a form of particles having different sizes and irregular shapes;
    exposing the ferrite feed materials to a plasma to provide a more spherical shape to irregularly shaped particles to thereby make a ferrite powder, and controllably supplying a non-ferrite ceramic precursor to the ferrite feed materials during the exposing; and
    forming the ferrite powder into a ferrite article.

17. A method according to claim 16 wherein forming comprises forming the ferrite powder into carrier beads.

18. A method according to claim 16 wherein forming comprises forming the ferrite powder into an inert anode.

19. A method according to claim 16 wherein forming comprises forming the ferrite powder into a body of an inductor.

20. A method according to claim 16 further comprising controlling at least one of providing and exposing to make the ferrite powder to have at least one of a predetermined phase ratio, surface morphology, density, magnetic moment, and volume electrical resistivity.

21. A method according to claim 20 wherein controlling comprises controlling at least one of a feed rate, an exposure time, and a temperature of the ferrite feed materials during the exposing.

22. A method according to claim 20 wherein controlling comprises controlling a composition of the ferrite feed materials.

23. A method according to claim 16 wherein the ferrite feed materials comprise at least one of nickel ferrite particles, manganese ferrite particles, magnesium ferrite particles, and zinc ferrite particles.

24. A method according to claim 16 wherein providing the ferrite feed materials comprises providing metal oxides.

25. A method according to claim 24 wherein the metal oxides are produced by heating waste material in a reactor while supplying oxygen thereto.

26. A method according to claim 24 wherein providing the metal oxides comprise spray drying the metal oxides.

27. A method according to claim 16 further comprising sorting the ferrite powder to have particle sizes within a predetermined range prior to forming.

28. A method according to claim 16 wherein the non-ferrite ceramic precursor comprises at least one of a silicate, alumina, and an organo-metallic.

29. A method for making ferrite powder comprising:
    providing ferrite feed materials in a form of particles having different sizes and irregular shapes; and
    exposing the ferrite feed materials to a plasma to provide a more spherical shape to irregularly shaped particles to thereby make the ferrite powder, and controllably supplying a calcined ferrite feed material to the ferrite feed materials during the exposing.

30. A method according to claim 29 further comprising controlling at least one of providing and exposing to make the ferrite powder to have at least one of a predetermined phase ratio, surface morphology, density, magnetic moment, and volume electrical resistivity.

31. A method according to claim 30 wherein controlling comprises controlling at least one of a feed rate, an exposure time, and a temperature of the ferrite feed materials during the exposing.

32. A method according to claim 30 wherein controlling comprises controlling a composition of the ferrite feed materials.

33. A method according to claim 32 wherein controlling comprises controllably supplying at least one additional material to the ferrite feed materials during the exposing.

34. A method according to claim 33 wherein the at least one additional material comprises oxygen.

35. A method according to claim 33 wherein the at least one additional material comprises hydrogen.

36. A method according to claim 33 wherein the at least one additional material comprises an inert gas.

37. A method according to claim 33 wherein the at least one additional material comprises at least one of copper and silver.

38. A method according to claim 33 wherein controllably supplying comprises coating the ferrite feed materials with at least one of a silicate, alumina, and an organo-metallic.

39. A method according to claim 29 wherein the ferrite feed materials comprise at least one of nickel ferrite particles, manganese ferrite particles, magnesium ferrite particles, and zinc ferrite particles.

40. A method according to claim 29 wherein providing the ferrite feed materials comprises providing metal oxides.

41. A method according to claim 40 wherein the metal oxides are produced by heating waste material in a reactor while supplying oxygen thereto.

42. A method according to claim 40 wherein providing the metal oxides comprises spray drying the metal oxides.

43. A method according to claim 29 further comprising sorting the ferrite powder to have particle sizes within a predetermined range.

* * * * *